July 15, 1930.   H. L. BROWNBACK   1,770,730
VALVE TAPPET AND GUIDE
Filed Sept. 8, 1928
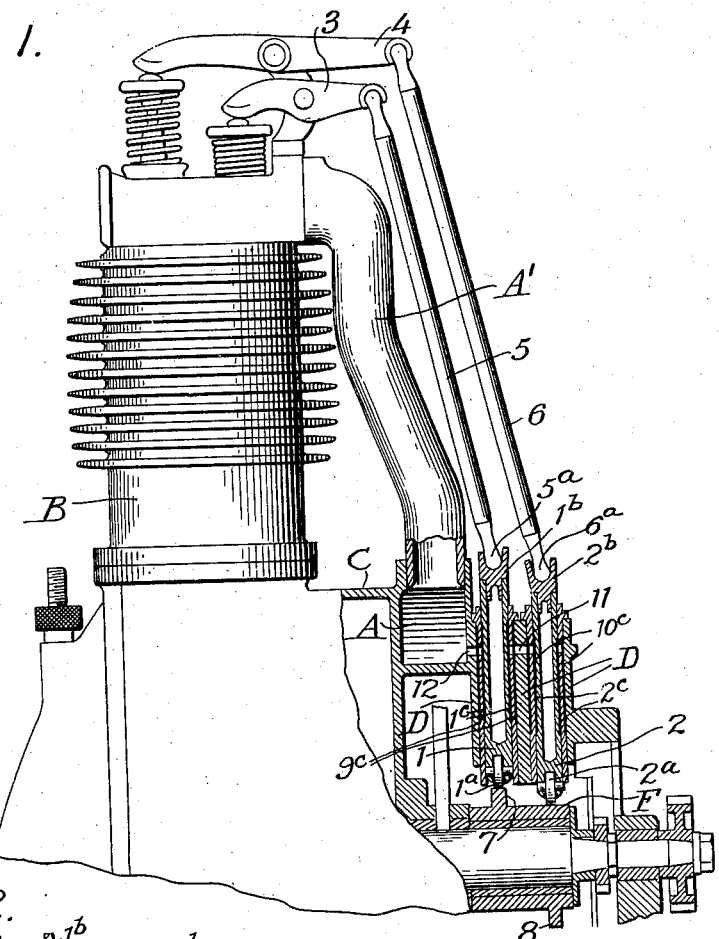
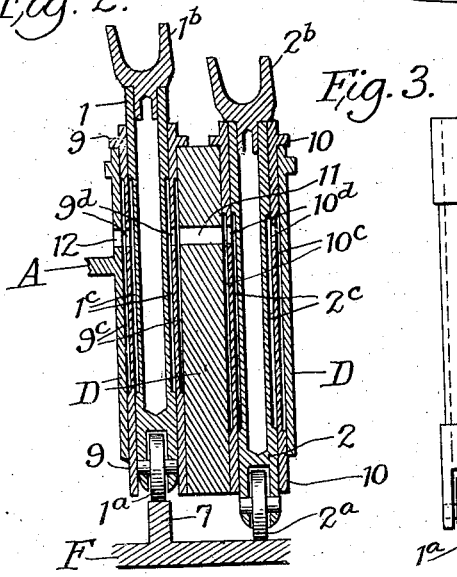
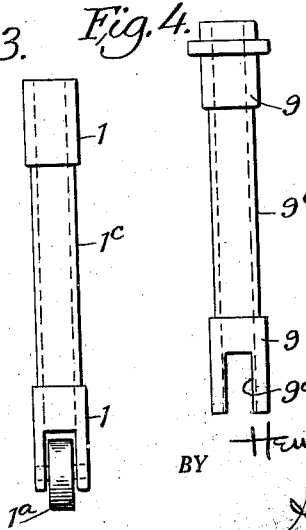
INVENTOR.
Henry L. Brownback
BY
Alexander Powell
ATTORNEYS Patented July 15, 1930

1,770,730

UNITED STATES PATENT OFFICE

HENRY LOWE BROWNBACK, OF NORRISTOWN, PENNSYLVANIA

VALVE TAPPET AND GUIDE

Application filed September 8, 1928. Serial No. 304,678.

This invention relates to the valve tappets and guides for internal combustion engines, and provides a simple, novel, and efficient means for collecting the surplus lubricating oil from around the valve tappets and guides to prevent external leakage.

Heretofore various means have been devised for withdrawing this surplus lubricating oil from around the valve tappets and guides and for passing same into the intake duct for the fuel vapors leading to the cylinders, using the "lower than atmospheric" pressure available in such duct to suck the surplus oil thereinto; and while in all such schemes the surplus oil was drawn off, still a considerable amount of air was simultaneously drawn into the intake duct thereby weakening or materially interfering with the fuel gas mixture through dilution; this condition being particularly apparent at low engine speeds.

In my invention as set forth in this application, the principal object is to entirely obviate the above mentioned difficulty and undesirable condition by the use of suitable oil seals, which while allowing the surplus oil to be drawn into the fuel duct or other aspiration tube at the same time the oil seals prevent the seepage of air into the intake duct or other aspiration tube, thereby preventing dilution of the fuel gases.

I will explain the invention with reference to the accompanying drawing which illustrates one practical embodiment thereof to enable others familiar with the art to adopt and use the same; and will summarize in the claims the novel features of construction, and novel combinations of parts, for which protection is desired.

In said drawings:—

Fig. 1 is an elevation of an internal combustion engine cylinder, showing in section the valve tappets, their guides, and adjacent portions of the engine block.

Fig. 2 is an enlarged detail section showing the ducts and oil seals in the tappets and guides, and the outlet therefrom into the intake duct.

Fig. 3 is an enlarged exterior view of a tappet, detached.

Fig. 4 is an enlarged exterior view of a tappet guide, detached.

The engine shown in the drawing is of radial type, having an annular fuel inlet duct A connecting the carburetor (not shown) with the several pipes A' leading to the inlet ports of the engine cylinders B, duct A being preferably cast into the crank case C between the tappet housing block D and the engine cylinder block proper. In block D are reciprocably mounted tappets 1 and 2 operating the rocker arms 3 and 4 respectively for the inlet and exhaust valves of the cylinder through adjustable push rods 5 and 6, one such set of tappets 1 and 2 with their push rods and rocker arms being provided for each cylinder. The tappets 1 and 2 may be of any suitable type, having rollers $1^a$, $2^a$ on their lower ends contacting with actuating cams 7 and 8 on a cam shaft F. In the upper ends of tappets 1, 2, are provided the usual sockets $1^b$, $2^b$ receiving the usual ball heads $5^a$, $6^a$, on the lower ends of the push rods.

The tappets 1 and 2 are provided with guides 9 and 10 respectively, preferably of bronze or other material and of tubular shape, the guides being disposed around the tappets and snugly fitting within bores in the block D, and serving as bushings for said tappets. The lower ends of the guides 9 and 10, are provided with slots as shown at $9^a$ in Fig. 4 through which the tappet rollers $1^a$, $2^a$ project, thereby preventing the tappets from rotating in their guides while permitting reciprocation of said tappets therein. The above described construction is well known and forms no part of my present invention.

As shown in Fig. 2, I provide in tappets 1 and 2, intermediate their ends shallow oil seals consisting of exterior annular grooves $1^c$, $2^c$ of width greater than the working strokes of the tappets. In the guides 9 and 10, I likewise provide shallow oil seals consisting of similar exterior annular grooves, $9^c$, $10^c$ disposed substantially opposite the grooves $1^c$, $2^c$ in the tappets. Also through the body of the tappet housing block D between the guides 9 and 10 I provide a bore 11, which registers with and is in constant communication with the annular grooves $9^c$, $10^c$ of the guides. Furthermore, in guides 9 and 10 opposite the ends of bore 11 are diametrically disposed perforations $9^d$ and $10^d$ whereby the grooves $1^c$ and $2^c$, $9^c$ and $10^c$ will be in constant direct communication for any position of the tappets in their guides. In the particular embodiment shown in the drawing, I also provide a bore 12 extending through the housing D opposite the bore 11 and communicating with the fuel duct A, whereby the grooves $1^c$, $2^c$, $9^c$ and $10^c$ will always be in direct communication with the aspiration point, or fuel duct A, having a lower than atmospheric pressure.

If however the fuel duct A should not be cast into the engine casing adjacent the tappet housing D, the bore 12 of housing D may readily be provided with any well known outlet pipe union (not shown) connecting with an aspiration pipe leading directly to the inlet duct of the engine or to any other suitable aspiration point.

In operation: As the engine is started, the aspiration of the inlet manifold A creates a partial vacuum in the ducts $1^c$, $2^c$, $9^c$, $10^c$, $9^d$, $10^d$, 11 and 12, and as the surplus lubricating oil around the tappets under the reciprocating action of the tappets 1 and 2 works down between the tappets and guides and block D into the annular grooves $1^c$, $2^c$, $9^c$, $10^c$ of the tappets and guides, the said surplus oil is drawn or sucked through the perforations $9^d$ and $10^d$ and through ducts 11 and 12 into the aspiration tube such as the inlet duct A. In this way the oil around the tappets 1, 2 is spread into thin sheets in the grooves $1^c$, $2^c$ and provides a perfect air seal as the sheets of oil around the tappets are always over the aspiration holes 11 and 12; and this oil seal is further safeguarded by the thin sheets of oil in the external grooves $9^c$ and $10^c$ of the guides 9 and 10, which oil seals prevent any air which might escape down the bore for the guides 9, 10 from working into the fuel duct A.

After these oil seals in the grooves are once established they will be maintained even when the engine is at rest by the adhesion of the thin sheets of oil to the metal surfaces, and by capillary action, thus sealing the same when the motor is started. This is especially advantageous in radial motors where the upsetting of the quality of the mixture reaching individual cylinders causes internal vibrations and rough running; furthermore the radial mounting of the tappets and guides makes them prone to lose oil.

I do not consider my invention limited to the exact form shown in the drawing for obviously changes may be made therein within the scope of the claims.

I claim:—

1. In an internal combustion engine having inlet and exhaust valves, and having an aspirating duct maintaining a less-than-atmospheric pressure; guides mounted in the engine block; valve tappets reciprocally mounted in the said guides, and means around the guides and tappets for collecting surplus lubricating oil and delivering same into the duct, said means preventing the seepage of aid into the duct.

2. In an internal combustion engine having inlet and exhaust valves, and having an aspirating duct maintaining a less-than-atmospheric pressure; tappet guides mounted in the engine block; valve tappets reciprocally mounted in the said guides, and means within the block around the guides and tappets for collecting and delivering surplus lubricating oil into the duct while preventing the seepage of air into the said duct.

3. In an internal combustion engine having inlet and exhaust valves, and having an aspirating inlet duct delivering fuel vapors at less-than-atmospheric pressure; tappet guides mounted in the engine block; valve tappets reciprocally mounted in the said guides; means within the block around the guides and tappets for collecting surplus lubricating oil; and means establishing constant communication between the collecting means and the fuel duct.

4. In an internal combustion engine having inlet and exhaust valves, and having an aspirating inlet duct delivering fuel vapors at less-than-atmospheric pressure; tappet guides mounted in the engine block; valve tappets reciprocally mounted in the said guides; and oil seals within the block disposed around the guides and tappets for collecting and delivering surplus lubricating oil to the fuel duct, and for preventing the seepage of air into the fuel duct with the said oil.

5. In an internal combustion engine having inlet and exhaust valves, and having an aspirating inlet duct delivering fuel vapors at less-than-atmospheric pressure; tappet guides mounted in the engine block; valve tappets reciprocally mounted in the said guides; and oil seals within the block disposed around the guides and tappets for collecting surplus lubricating oil; and means establishing constant communication between the oil seals and the fuel duct whereby seepage of air into the fuel duct will be prevented.

6. In an internal combustion engine having inlet and exhaust valves, and having an aspirating inlet duct delivering fuel vapors at less-than-atmospheric pressure; tappet guides mounted in the engine block; valve tappets reciprocally mounted in the said guides; intercommunicating external annular grooves around the guides and tappets for collecting surplus lubricating oil; and means for conducting the surplus oil from the grooves to the fuel duct; the seepage of air into the fuel duct being prevented by the oil seals formed by said grooves.

7. In an internal combustion engine having inlet and exhaust valves, and having an aspirating inlet duct delivering fuel vapors at less-than-atmospheric pressure; tubular tapper guides mounted in the engine block; valve tappets reciprocally mounted in the said guides, intercommunicating external annular grooves around the guides and tappets for collecting surplus lubricating oil, and means establishing constant communication between all the grooves and the fuel duct; the seepage of air into the fuel duct being prevented by the oil seals formed by said grooves.

HENRY LOWE BROWNBACK.